US007698370B1

(12) United States Patent
Hall

(10) Patent No.: US 7,698,370 B1
(45) Date of Patent: *Apr. 13, 2010

(54) SYSTEM AND METHOD FOR CIRCUMVENTING SPAM FILTERS

(75) Inventor: Robert J. Hall, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 869 days.

This patent is subject to a terminal disclaimer.

(21) Appl. No.: 11/051,158

(22) Filed: Feb. 7, 2005

Related U.S. Application Data

(63) Continuation of application No. 10/418,243, filed on Apr. 16, 2003, now Pat. No. 6,915,334, which is a continuation of application No. 09/465,421, filed on Dec. 16, 1999, now Pat. No. 6,643,686.

(60) Provisional application No. 60/112,998, filed on Dec. 18, 1998.

(51) Int. Cl.
*G06F 13/00* (2006.01)

(52) U.S. Cl. ...................................... 709/206

(58) Field of Classification Search ......... 709/206–207, 709/245–246; 707/6–7
See application file for complete search history.

(56) References Cited

U.S. PATENT DOCUMENTS

| | | | | |
|---|---|---|---|---|
| 5,890,176 A * | 3/1999 | Kish et al. | ................. | 715/511 |
| 5,930,479 A * | 7/1999 | Hall | ........................ | 709/238 |
| 5,999,932 A * | 12/1999 | Paul | ........................ | 707/10 |
| 6,023,708 A * | 2/2000 | Mendez et al. | ............. | 707/203 |
| 6,073,140 A * | 6/2000 | Morgan et al. | ............. | 707/203 |
| 6,112,227 A * | 8/2000 | Heiner | ..................... | 709/203 |
| 6,115,709 A * | 9/2000 | Gilmour et al. | ............. | 707/9 |
| 6,138,151 A * | 10/2000 | Reber et al. | ................ | 709/219 |
| 6,148,329 A * | 11/2000 | Meyer | ..................... | 709/206 |
| 6,161,130 A * | 12/2000 | Horvitz et al. | ............. | 709/206 |
| 6,167,434 A * | 12/2000 | Pang | ........................ | 709/206 |
| 6,212,552 B1 * | 4/2001 | Biliris et al. | .............. | 709/206 |
| 6,216,122 B1 * | 4/2001 | Elson | ...................... | 707/3 |
| 6,311,277 B1 * | 10/2001 | Takaragi et al. | ............ | 726/6 |
| 6,351,764 B1 * | 2/2002 | Voticky et al. | ............. | 709/207 |
| 6,356,935 B1 * | 3/2002 | Gibbs | ...................... | 709/206 |
| 6,405,243 B1 * | 6/2002 | Nielsen | .................... | 709/206 |
| 6,421,709 B1 * | 7/2002 | McCormick et al. | ....... | 709/206 |
| 6,643,686 B1 * | 11/2003 | Hall | ........................ | 709/206 |
| 6,732,149 B1 * | 5/2004 | Kephart | ................... | 709/206 |

(Continued)

OTHER PUBLICATIONS

CICA, "I-005c: Email Spamminf countermeasures", Information Bulletin, Computer Incident Advisory Caapbility, Nov. 25, 1997, 4 pages. Communication News, "Study Group on Countermeasures against Unsolicited/Nuisance E-mails Compile an Interim Report", MPHPT ISSN 134-5317, Japan, Feb. 25, 2002, 6 pages.*

(Continued)

*Primary Examiner*—Robert B Harrell

(57) ABSTRACT

A system and method for circumventing schemes that use duplication detection to detect and block unsolicited e-mail (spam.) An address on a list is assigned to one of m sublists, where m is an integer that is greater than one. A set of m different messages are created. A different message from the set of m different messages is sent to the addresses on each sublist. In this way, spam countermeasures based upon duplicate detection schemes are foiled.

17 Claims, 4 Drawing Sheets

U.S. PATENT DOCUMENTS

| | | | | |
|---|---|---|---|---|
| 6,757,830 | B1* | 6/2004 | Tarbotton et al. | 713/188 |
| 6,915,334 | B1* | 7/2005 | Hall | 709/207 |
| 7,054,906 | B2* | 5/2006 | Levosky | 709/206 |
| 7,089,241 | B1* | 8/2006 | Alspector et al. | 707/7 |
| 2005/0022008 | A1* | 1/2005 | Goodman et al. | 713/201 |
| 2005/0060643 | A1* | 3/2005 | Glass et al. | 715/501.1 |
| 2006/0080393 | A1* | 4/2006 | Cardone et al. | 709/206 |
| 2006/0168006 | A1* | 7/2006 | Shannon et al. | 709/206 |
| 2006/0168329 | A1* | 7/2006 | Tan et al. | 709/238 |

OTHER PUBLICATIONS

Snyder Joel, "Test: SPAM in the wild", Sep. 15, 2003, NetworkWorld, 11 pages. Havard Wik Thorkildssen, "SPAM—Different Approaches to Fighting Unsolicited Commercial Email; A servey of SPAM and SPAM Countermeasures", pp. 45-55.*

Williams Tim, "ECM—Email Countermeasures", www.u.arizona.edu/~trw/spam/, 4 pages.*

Robert J. Hall, "How to Avoid Unwanted Email", Mar. 1998, Vo. 41, No. 3, Communications of the ACM, pp. 88-95.*

Cranor et al., "SPAM!", Aug. 1998, vol. 41, No. 8, Communications of the ACM, pp. 74-83.*

Marketing Tips Newsletter, "Email Marketing", Jun. 9, 2006, www.marketingtips.com, 6 pages.*

* cited by examiner

FIG. 3

| m \ n | 1 | 2 | 3 | 4 | 5 | 6 | 7 | 8 | 9 | 10 | 11 |
|---|---|---|---|---|---|---|---|---|---|---|---|
| 1 | 0 | 1 | 1 | | | 1 | 1 | 1 | 1 | 1 | 1 |
| 2 | 0 | .500 | .250 | | | .812 | .891 | .937 | .965 | .980 | .989 |
| 3 | 0 | .333 | | | .9 | .333 | .443 | .557 | .660 | .744 | .811 |
| 4 | 0 | .250 | | | .121 | .162 | .195 | .240 | .302 | .378 | .460 |
| 5 | 0 | .200 | | | .066 | .090 | .095 | .114 | .139 | .171 | .211 |
| 6 | 0 | .167 | | | .039 | .055 | .051 | .060 | .069 | .081 | .099 |
| 7 | 0 | .143 | | | .025 | .036 | .030 | .034 | .036 | .042 | .049 |
| 8 | 0 | .125 | | | .017 | .025 | .018 | .021 | .021 | .023 | .026 |
| 9 | 0 | .111 | | | .012 | .018 | .012 | .013 | .012 | .013 | .014 |
| 10 | 0 | .100 | | | .009 | .013 | .008 | .009 | .008 | .008 | .008 |
| 11 | 0 | .091 | | | .007 | .010 | .006 | .006 | .005 | .005 | .005 |

SYSTEM AND METHOD FOR CIRCUMVENTING SPAM FILTERS

CROSS-REFERENCE TO RELATED APPLICATIONS

This is a continuation of U.S. patent application Ser. No. 10/418,243 filed Apr. 16, 2003, now U.S. Pat. No. 6,915,334, issued Jul. 5, 2005, which was a continuation U.S. patent application Ser. No. 09/465,421 filed Dec. 16, 1999, now U.S. Pat. No. 6,643,686, issued Nov. 4, 2003. The latter application claimed the benefit of U.S. Provisional Application No. 60/112,998, filed on Dec. 18, 1998.

BACKGROUND OF THE INVENTION

The receipt of unsolicited electronic mail ("e-mail") messages ("spam") has become a nuisance for networked computer users. In response, numerous techniques have been developed to detect spam and prevent it from being delivered to its intended destination. Several known methods of filtering spam are based upon detecting and deleting duplicate copies of a spam message. For example, one known method of filtering spam from more legitimate messages is called Filtering by Duplicate Detection (FDD). A sender of spam (a "spammer") typically does not know if two or more addresses on his address list point to the same mailbox. The FDD method creates and maintains two or more e-mail addresses that point to the same mailbox. Whenever the same message is received more than once, it is determined to be spam and is deleted. Additionally, information from the spam can be stored (e.g., in a database) for use in identifying other spam (e.g., e-mail from the same sender, with the same subject line, etc.)

Another known method of filtering spam is called Collaborative Filtering (CF). In the CF method, many users work together to maintain a central repository of received spam messages and all users' mail software checks this repository to see if a given message is in it; if so, the message is deleted from the user's mail box. The power of CF stems from its automatic detection of duplicate messages by the user's e-mail client software comparing each newly arrived message with the list of spam messages maintained at the central server.

A third method, Manual Filtering (MF), is the most widely used method in the Internet today. Users of MF read all or part of each message and determine whether it is spam. Due to properties of the human visual and cognitive system, MF users can more easily and quickly detect a copy of a previously seen message than they can determine whether a message is spam. Thus, MF users also benefit from duplicate detection through increased efficiency.

Existing approaches to solving the spam problem further include rule-based filtering, cryptographic authentication. See RSA Data Security; "S/MIME Central"; http://raw.rsa.com/smime/; and S. Garfinkel; *PGP: Pretty Good Privacy*; Sebastopol, Calif.: O'Reilly and Assoc; 1995. Various sendmail enhancements have also been proposed and implemented. See B. Costales, E. Allman, & N. Rickert; Sendmail; Sebastopol, Calif.: O'Reilly and Assoc; 1993. See http://~.sendmail.org/ for the latest enhancements; and see email channels in R. J. Hall; How to avoid unwanted email; *Comm. ACM* 41(S'), 88-95, March 1998. These techniques are all of varying levels of effectiveness, applicability, and practicality. For surveys of anti-spam technology, see L. Cranor, B. LaMacchia; Spam!; to appear in *Comm. ACM*, 1998.http://wwu.research.att.com/~lorrie/pubs/spam!; and R. J. Hall; How to avoid unwanted email; *Comm. ACM* 41(S'), 88-95, March 1998.

Summarizing, in FDD, the idea is to maintain and publicly distribute two (or more) email addresses, both forwarding to the same mailbox. An email software agent then automatically deletes any messages that are received more than once. It gets its power from the fact that spammers (originators of spam) have no general way of telling when two addresses they have culled from newsgroups, web sites, etc, point to the same mailbox. In CF, the idea is that a group of email users establishes a central server that maintains a list of known spam messages; each time a new spam message is received (and recognized as such) by some user, that user adds it to the server's list. Then, each user employs agent software that screens out any message appearing on the server's list. Even MF, where the user reads and recognizes spam messages himself, benefits from duplicate detection, because spammers often send messages many times to the same list; the attentive MF user will more quickly delete second and succeeding copies, due to the power of human visual pattern recognition.

SUMMARY OF THE INVENTION

An embodiment of the present invention includes a system and method for counteracting schemes for blocking unsolicited e-mail (spam) that are based upon duplicate detection. An e-mail recipient's address on a list is assigned to one of m sublists, where m is an integer greater than 1. m different messages are created. A different the message of the m messages is sent to the addresses on each sublist. In this way, spam countermeasures based upon duplicate detection schemes are foiled.

BRIEF DESCRIPTION OF THE DRAWINGS

FIG. 3 is a table showing computed values of P(m, n), the probability that all versions of an original message will be filtered.

DETAILED DESCRIPTION OF THE INVENTION

Figure 1:
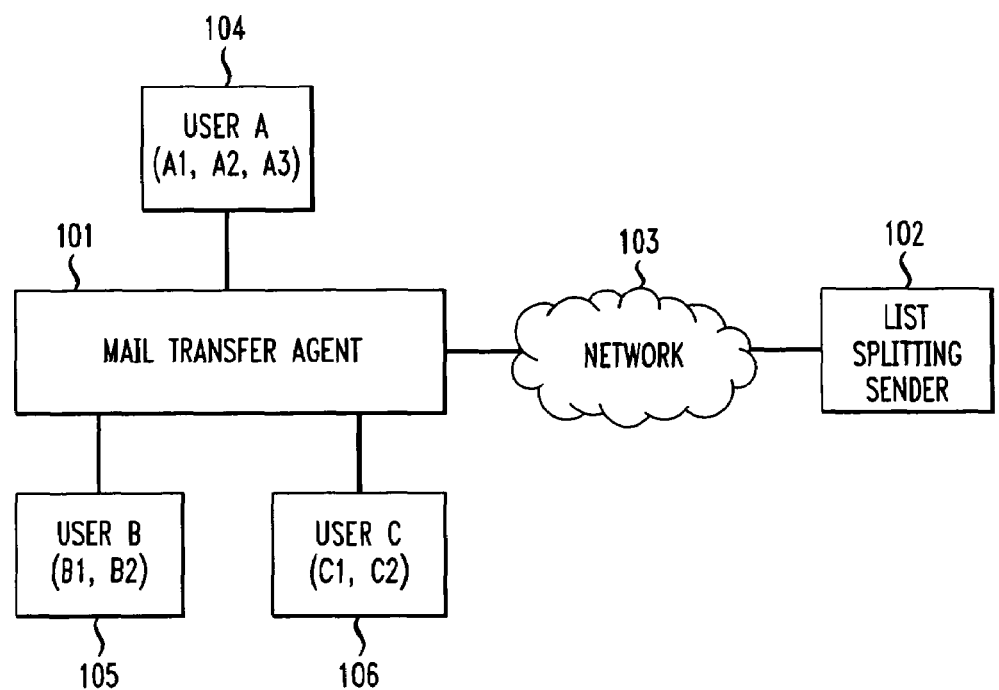
FIG. 1 is a partial schematic diagram of an exemplary system in accordance with one embodiment of the present invention.

In accordance with an embodiment of the present invention, the effectiveness of techniques that exploit duplicate detection can be counteracted by partitioning the spam address list into two or more sublists, and then sending a different version of the message to all of the recipients on each sublist. The object is to defeat duplicate detection by decreasing the likelihood of receiving duplicates by, in turn, increasing the number of message versions. For example, list splitting defeats FDD by sending different versions of the message to the different mailboxes representing the same user; they will therefore not be identified as duplicates and, hence, not deleted as spam. List splitting defeats collaborative filtering by decreasing the likelihood that every message version will be seen by an active user (i.e., one who actually reports messages to the central server), and hence reported to the central server. List splitting defeats MF when the spammer sends the message multiple times, re-randomizing each time, thereby making it likely that each user will receive multiple different versions.

In accordance with one embodiment of the present invention, a spam address list is partitioned into m sublists, m different versions of the message are created, and a different version of the message is sent to the recipients on each sublist.

It is advantageous to partition an address list into m sublists by randomly assigning each address on the list to one of the m sublists. This advantageously helps avoid placing two addresses that occur nearby each other on the list to the same sublist. Nearby addresses on the list may be to the same mailbox. If two such addresses appear on the same sublist, then the same version is sent to the two addresses, and the message is disadvantageously detectable as spam.

Another way to partition an address list into m sublists is to use any information available about the addresses to avoid placing two or more addresses to the same mailbox on the same sublist. For example, addresses that are substantially similar (e.g., fred1@xyz.com and fred2@xyz.com) are deliberately placed on different sublists. Identifying an address on the list that is substantially similar to another address can be advantageously performed by a number of string comparison methods well known in the art. In one embodiment of the present invention, a first address is "substantially similar" to a second address if the first address at least 50% of its characters occur in the second address in the same order as in the first address. In another embodiment, two addresses are substantially similar even if they share fewer than 50% of the characters in either address, but contain the same distinctive string. For example, in this embodiment, the addresses A1XB4@zebra.com is "substantially similar" to A1XB4@phoenix.net. Even though both addresses share only a small string in relation to their sizes, there are grounds to suspect that they may pertain to the same user. Any convenient metric for determining substantial similarity can be used in accordance with the present invention, provided such a metric is designed to identify distinct addresses that are likely to point to the same mailbox.

A system in accordance with an embodiment of the present invention is shown in FIG. 1. Mail transfer agent 101 is coupled to e-mail sender 102 through network 103. Mail transfer agent 101 is coupled to user A 104, user B 105 and user C 106. Mail transfer agent 101 receives e-mail addressed to user A 104, user B 105 and user C 106, and then forwards the e-mail to its intended destination. In this example, user A 104 has three e-mail addresses, A1, A2 and A3; user B 105 has two e-mail addresses, B1 and B2; and user C 106 has two e-mail addresses, C1 and C2. Sender 102 stores an address list. In the embodiment shown in FIG. 1, sender 102 stores addresses including A1, A2, A3, B1, B2, C1 and C2. In accordance with the present invention, sender 102 creates sublists, and assigns the addresses on the list to the sublists. In this example, the sender assigns the addresses on the list to three sublists as follows:

| Sublist | Addresses |
|---------|-----------|
| 1 | A1, B1 |
| 2 | A2, B2, C1 |
| 3 | A3, C2 |

The sender creates a different version of an e-mail message (e.g., spam) for each sublist. Examples of differences between versions include different source addresses, different subject lines and variations in the body of the message, and any combination thereof. Another method for systematic message version generation is based on the message originator creating a number paragraph-variant sets, where for one or more paragraphs in the original message, a collection of semantically equivalent, yet syntactically different, variants is created. Software can then generate message versions by systematically choosing one variant from each set of paragraph-variants to make up each version. This allows exponentially many message versions to be created from a small amount of spammer effort.

The sender sends a different version of the message to each sublist. In the example shown in FIG. 1, the sender sends a first version of the message to addresses A1 and B1 on sublist 1; a second version to addresses A2, B2 and C1 on sublist 2; and a third version to addresses A3 and to C2 on sublist 3. As shown in FIG. 1, the messages first arrive at mail transfer agent 101.

Mail transfer agent 101 stores information that lists the addresses for each mailbox. For example, the mail transfer agent 101 stores information that indicates that addresses A1, A2 and A3 indicate a single mailbox for user A 104; addresses B1 and B2 point to a single mailbox for user B 105; and addresses C1 and C2 point to a mailbox for user C 106. Mail transfer agent 101 implements a FDD process by detecting duplicate messages that are sent to the same mailbox. If two or more such messages are determined to be the same, then they are classified to be spam, and are prevented at the mail transfer agent 101 from being delivered to their intended recipient (mailbox). For example, the messages are deleted by the mail transfer agent 101.

By splitting the senders address list into sublists, and sending different versions of a message to each sublist, the present invention advantageously circumvents the FDD process, and spam can be successfully delivered to its intended destination. In the example shown in FIG. 1, comparing the sender's messages to any one mailbox will show no duplication: three different versions are addressed to A1, A2 and A3, respectively, and two different versions are addressed to B1 and B2, respectively, and to C1 and C2, respectively.

An embodiment of the present invention is just as effective when the FDD method is implemented at the user (e.g., at user A 104, user B 105 and user C 106), rather than at an intermediary between the sender and the user, such as a mail transfer agent 101.

List splitting is also an effective countermeasure against the collaborative filtering method. Every time a variant of an electronic message is generated and sent by a spammer, the new variant is not generally identified as belonging to a set of spam messages stored in a central repository. For example, a message identified as spam is stored with a body that includes the text "SUBSCRIBE NOW TO TELCO SERVICES 9¢ PER MINUTE LONG DISTANCE." A new message that is a linguistic variant of the stored message is received at, a mailbox. For example, the new message body includes, "We are offering the cheapest calling anywhere." The new message is compared to messages in the central repository, but no match is found because of the linguistic variation between the new and old messages, even though their meaning is substantially the same. The collaborative filtering method advantageously fails to detect that the new message generated in accordance with an embodiment of the present invention is spam.

Likewise, list splitting is also effective against manual filtering. A user is more likely to recognize and delete a duplicate of a spam message before reading very much of it. The variant versions of the same message sent in accordance with an embodiment of the present invention at least diminish the advantage of prior experience in detecting and deleting spam. For example, a user is more likely to read more of a second message that states, "We are offering the cheapest calling anywhere" after having previously read a first message that states "SUBSCRIBE NOW TO TELCO SERVICES 9¢ PER MINUTE LONG DISTANCE" than he is to read a second, duplicate occurrence of the first message.

Figure 2:
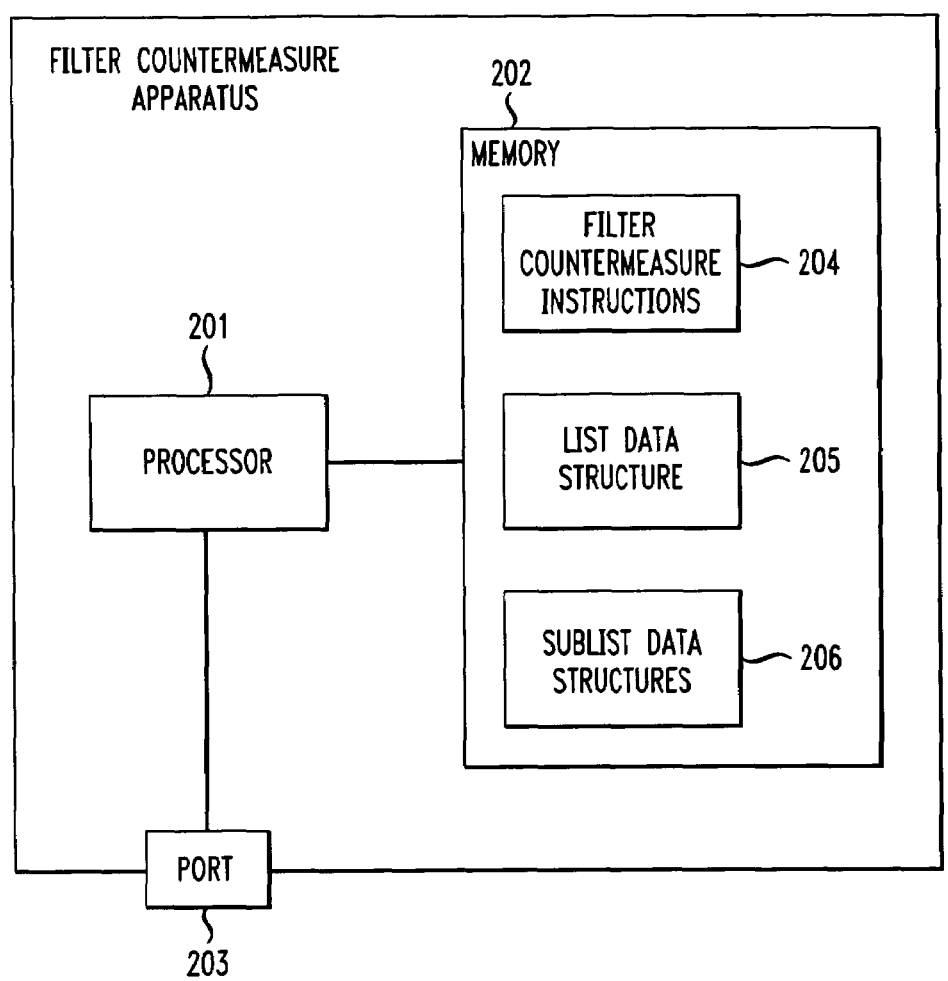
FIG. 2 is a partial schematic diagram of an exemplary apparatus in accordance with one embodiment of the present invention.

An apparatus in accordance with an embodiment of the present invention is shown in FIG. 2. The embodiment includes a processor 201, a memory 202 and a port 203. The processor in one embodiment is a general purpose microprocessor, such as the Pentium II processor manufactured by the Intel Corporation of Santa Clara, Calif. In another embodiment, the processor 201 is an Application Specific Integrated Circuit (ASIC), which has been designed to perform in hardware and firmware at least part of the method in accordance with an embodiment of the present invention.

Memory 202 is any device adapted to store digital information, such as Random Access Memory (RAM), flash memory, a hard disk, an optical digital storage device, any combination thereof, etc. As shown in FIG. 2, memory 202 is coupled to processor 201. The term "coupled" means connected directly or indirectly. Thus, A is "coupled" to C if A is directly connected to C, and A is "coupled" to C if A is connected directly to B, and B is directly connected to C.

Memory 202 stores filter countermeasure instructions 204 that are adapted to be executed by processor 201. The term "adapted to be executed" is meant to encompass any instructions that are ready to be executed in their present form (e.g., machine code) by processor 201, or require further manipulation (e.g., to be compiled, decrypted, be provided with an access code, etc.) to be ready to be executed by processor 201. Filter countermeasure instructions 204 are adapted to be executed by processor 201 to perform the method in accordance with an embodiment of the present invention. For example, filter countermeasure instructions 204 are adapted to be executed by processor 201 to divide a list into m sublists, generate m different versions of a message, and send a different version to each sublist. A version is said to be "sent to a sublist" when it is sent to at least one address on the sublist. Memory 202 also stores a list and a sublist in one embodiment. Memory 202 is meant to encompass separate digital storage devices (e.g., a database, a remote hard disk, etc.); in other words, memory 202 encompasses distributed memory. Thus, filtering countermeasure instructions can be stored in one memory device, while a list can be stored on another memory device accessed by processor 201 through a network via port 203, and a sublist can be stored on yet another memory device. In FIG. 2, an address list data structure 205 is shown stored in memory 202. In this embodiment, the list data structure 205 includes a set of addresses of prospective recipients of messages, e.g., a spam address list. FIG. 2 also shows memory 202 storing a plurality of sublist data structures 206. Each sublist data structure of the plurality of sublist data structures 206 includes a subset of the addresses that are included in the address list data structure 205. Port 203 is adapted to be coupled to a network. Port 203 is also coupled to processor 201.

In accordance with one embodiment of the present invention, filtering countermeasure instructions are stored on a medium and distributed as software. The medium is any device adapted to store digital information, and corresponds to memory 202. For example, a medium is a portable magnetic disk, such as a floppy disk; or a Zip disk, manufactured by the Iomega Corporation of Roy, Utah; or a Compact Disk Read Only Memory (CD-ROM) as is known in the art for distributing software. The medium is distributed to a user that has a processor suitable for executing the filtering countermeasure instructions, e.g., to a user with a server having a processor, memory and a port adapted to be coupled to a network.

A more rigorous, analytical treatment of how the list-splitting countercountermeasure family, LS(m), works is as follows. The LS(m) spammer wants to send a message of given semantic content to as many members of a mailing list as possible. The spammer first creates m equivalent but non-identical, versions of the message, then randomly assigns each address in the list one of the m versions, and finally sends each address its assigned version. Intuitively, this decreases the effectiveness of duplicate detection techniques because there are far fewer pairs of duplicate messages to be detected, as long as different message versions are not easily detectable as such. Later, we analyze the effectiveness of LS assuming this condition is true.

Prior to that, however, how realistic is it to assume that m distinct versions can be systematically generated? First of all, it is straightforward to apply simple syntactic variations to a message in such a way that the semantic content of the message is unchanged, using techniques analogous to those of digital document marking, see J. Brassil, S. Low, N. F. Maxemchuk, L. O'Gorman; Electronic marking and identification techniques to discourage document copying; *IEEE J Selected Areas in Communications* 13(8), 1495-1504, October, 1995. One can add or remove whitespace characters, change capitalization or punctuation, and add, or remove banners and other peripheral information.

However, for any set of simple syntactic variations, one can also imagine a clever automatic duplicate detector that might not be fooled. More problematic for automatic detection, however, would be the method of linguistic variants: while composing the original message, select k of the paragraphs and compose two linguistically completely different, yet practically semantically equivalent, paraphrases for each. For example, one paragraph might be Jane Doe, of East Nowhere, Me., writes "My whole life was changed when I joined the team. My looks improved, I met people with better cars, and several thousand dollars per day arrived in my mail box."

The following paragraph might well be equivalent for the spammer's purposes:

Marvin Smith, of Central Prairie, Mont., writes "I couldn't believe how much happier I became after signing on! The extra money allowed me to pursue my childhood dreams."

Once the k paragraph pairs are composed, it is simple to automate $2^k$ message variations, by systematically choosing one variant from each pair in all possible ways. Moreover, in order to avoid duplicate detectors that look for large percentage overlaps, one can use 2k paragraph pairs and use coding techniques that allow $2^k$ widely different message variations. Reordering the paragraphs may help as well, when that is possible semantically.

Another obfuscating technique is to vary the text at the word level by replacing selected words with synonyms; e.g., fantastic↔marvelous, etc. Thus, one can evade even duplicate detectors that look for long common phrases.

Using only linguistic variants, increasing the number of versions m requires only a logarithmic effort. The other techniques mentioned require no significant human effort. These techniques (and others) show it is quite reasonable to assume a spammer can systematically generate large numbers of practically undetectable variations of a message at very low cost.

We now consider three anti-spam technologies based on duplicate-detection, and quantitatively analyzes the effectiveness of LS (list splitting) against each.

In Filtering by Duplicate Detection (FDD), the user maintains some number n of different addresses that all forward to one and the same mailbox, as well as a software agent that automatically detects and deletes any message received more than once. Friends and other legitimate correspondents will send to only one address, so their messages will not be multiply received and hence deleted. On the other hand, for newsgroup postings and web page mailtos (primary sources from which spammers collect mailing lists as discussed in L. Cranor, B. LaMacchia; Spam!; to appear in *Comm. ACM*, 1998.http://wwu.research.att.com/~lorrie/pubs/spam!) one either provides all the addresses, assuming the spammer's collection tools can't detect this, or else randomly switches among the addresses. This makes it likely spammers will pick up all of the addresses in their automatic collection processes. Information about FDD can be found in B. K. Sherman, personal communication, 1998.

Detecting Duplicate Messages. One needs to be a bit clever in detecting duplicate messages. Header lines will vary quite a bit when the same message is sent via two different addresses. Header information such as "received-by," "to," "date," and message IDs can be quite different. Also, since messages can take widely different amounts of real time to travel the different routes, the question arises of how long to hold a message (waiting for possible duplicates) before presenting it to the user. These subtleties are resolved adequately by comparing message bodies only, and by doing the filtering at regular intervals, such as once per day when logging in.

Advantages and Disadvantages. Compared to other anti-spam techniques, FDD is relatively practical and usable. One need not constantly maintain complex filtering rule sets; one need not manage keys, certificates, and trust policies; and one doesn't even classify messages as spam or nonspam. The only slight complication is easily distributing all the addresses when posting to newsgroups and filling out product-registration cards. The use of signature files helps with this problem.

It is not without usability disadvantages, however. While many organizations offer forwarding accounts for free, the typical user may have to pay for most of his forwarding addresses. Some messages that the user wishes to see, such as conference and talk announcements, may be received multiple times due to overlapping interest distribution lists or multiple reminders. These are filtered out. Of course, if two copies are both addressed to the same one of the user's addresses, then a clever filter can choose not to delete them. Also, the mail server must handle and possibly download n copies of each spam message, increasing the user's and ISP's costs. Finally, the need for delaying message delivery in order to see if duplicates arrive will bother those users wishing to receive their messages as soon as possible.

We now consider FDD vs LS(m). The probability of a 2-address FDD user successfully filtering a message is 1/m, where m is the number of slots (sublists). On the other hand, adding an address tends to increase the screening probability for fixed m. In an arms race of user versus spammer, we can expect to see changes in both m and n, so we need to analyze the probability variation for all m and n.

Definition. Suppose a user maintains n email addresses, and a spammer randomly (uniformly) assigns each address to one of m sublists, sending a distinct version of an original message to each of the sublists. Define P(m, n) to be the probability that FDD will successfully filter out (all versions of) the original message.

More abstractly, this is the same as the probability of randomly choosing an assignment of n (distinct) objects to m slots in such a way that none of the m resulting slot-sets is a singleton; the message fails to reach the user if and only if every message variation goes to either zero or at least two of the user's n addresses.

Consider how to calculate P(m,n). In order to find a formula for P, it is useful to count the number of assignments that leave at least one slot (subset) a singleton. In particular, let us define a family of approximations to this as follows. Let $S_1(m,n)$ be the number of assignments leaving slot #1 a singleton. Let $S_2(m, n)$ be the number of assignments leaving at least one of slots #1 and #2 a singleton. For any $k \leq m$, let $S_k(m,n)$ be the number of assignments leaving at least one of slots #1 ... #k a singleton. Then, since there are $m^n$ total assignments, we can define an approximation $P_k(m,n)$ to P as Definition.

$$P_k(m, n) \equiv 1 - \frac{S_k(m, n)}{m^n}$$

Now, from the definition, $S_k(m,n) \leq S_{k+1}(m,n)$ for all $1 \leq k < m$, because every assignment leaving a singleton in one of the first k slots also leaves a singleton in one of the first k+1 slots.

It follows, therefore, that $$P_1(m,n) > P_2(m,n) \geq \ldots \geq P_m(m,n) = P(m,n)$$

The latter equality holds because a message is filtered iff there is not a singleton among the (first/all) m slots.

Theorem FDD1. The number of assignments of n things to m slots leaving a singleton in at least one of the first k slots, is $$S_k(m, n) = \sum_{j=1}^{min(k,n)} (-1)^{j-1} \binom{k}{j} n^{\underline{j}} (m-j)^{n-j}$$

where, following notation of Graham et al in R. Graham, D. Knuth, O. Patashnik; *Concrete Mathematics: A Foundation for Computer Science*; Reading, Mass.: Addison-Wesley; 1989, 1994.

$$a^{\underline{j}} = \begin{cases} 1 & \text{if } (j = 0) \\ a(a-1)(a-2) \ldots (a-j+1) & \text{if (integer } j > 0) \end{cases}$$

Proof. See Appendix A.1, at the end of the Detailed Description.

Substituting this formula into the definition of $P_k$, and setting k=m,

Corollary FDD2.

$$P(m, n) = \sum_{j=0}^{min\{m,n\}} (-1)^j \binom{m}{j} \frac{n^{\underline{j}}}{m^j} \left(\frac{m-j}{m}\right)^{n-j}$$

It is simple to write a program to compute values of P given values for m and n, in a language providing exact bignum arithmetic, such as Common Lisp. The table shown in FIG. 3 gives computed values of P to three decimal places for low values of m and n. Note that proceeding from left to right in a row, we do not have monotonic increase, as we might expect from the fact that the "average number of elements per slot" goes up. However, as n→∞ for fixed m, the probability that any particular slot will have exactly 1 out of n addresses assigned to it goes to zero. Therefore, P(m,n)→1 for fixed m as n→∞, so a user can keep the screening probability high by increasing n.

Estimating $N_p(m)$: How high must n be set for a given m to have a given screening probability?

Definition. Let $N_p(m)$ be the minimum n such that $P(m,n) \geq p$.

Figure 4:
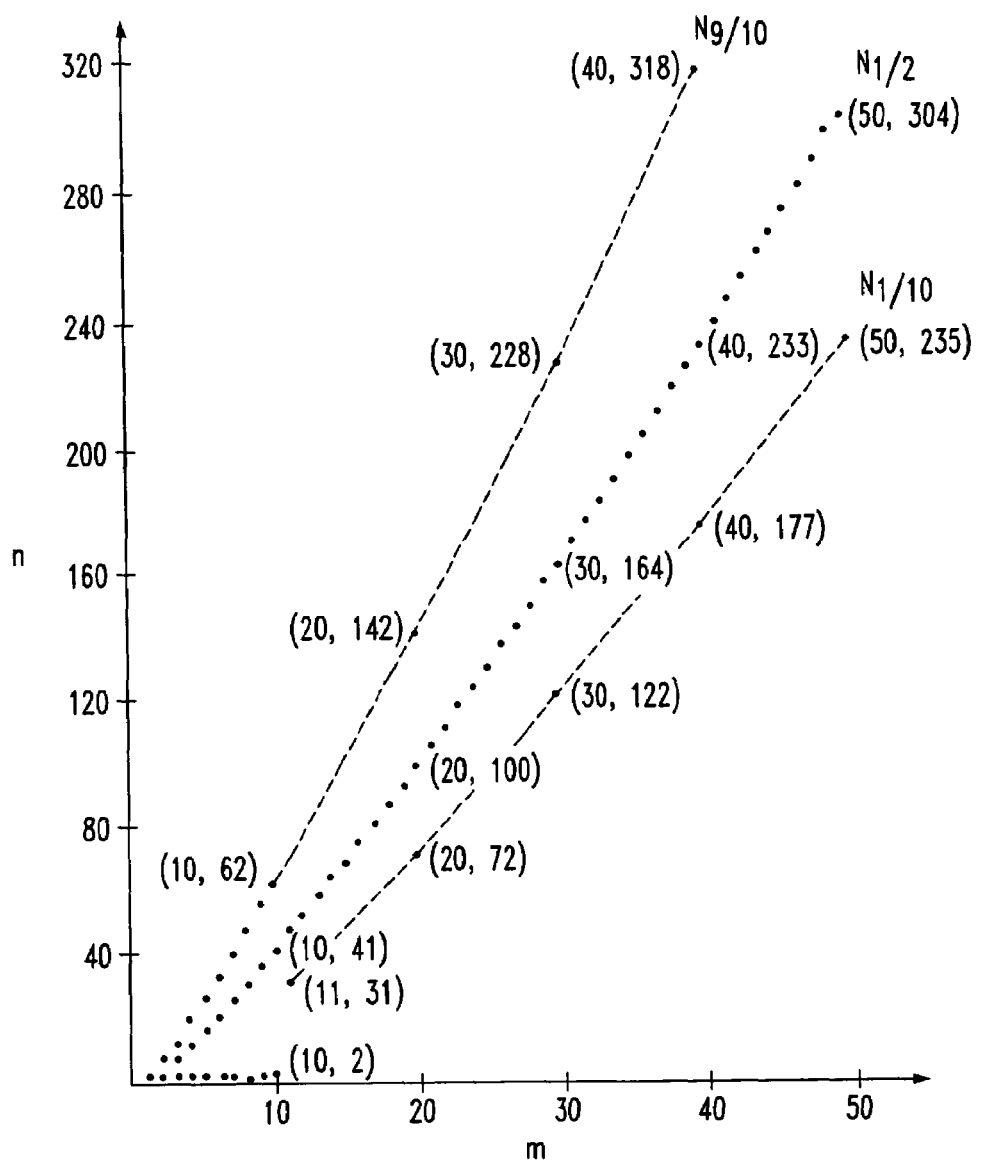
FIG. 4 is a graph showing a number of objects n versus a number of slots m for given screening probabilities.

Note that as long as $m \leq 1/p$, $N_p(m)=2$; this follows from the fact that P(m, 2)=1/m as noted previously. Using the program that produced the data for the table shown in FIG. 3, it is straight-forward to compute $N_p(m)$ for somewhat larger m. FIG. 4 shows a graph of $N_{1/10}$, $N_{1/2}$, and $N_{9/10}$ versus m. For example, if m=10, a user must maintain 41 addresses in order to have a 50-50 chance of filtering the message; if m=20, $N_{1/2}$ is 100. The "slope" of $N_{1/2}$ is increasing, indicating superlinear behavior; however, the "third derivative" of $N_{1/2}$ appears to be negative: the "slope" is roughly 5 at m=5, 6 at m=12, and 7 not until m=22. Is it possible $N_p$ eventually slows down?

As a practical matter, it is important to consider a more basic question first: does $N_p$ ever decrease? If it did, then it would make list-splitting more difficult to use, since one would have to check when increasing m whether one had actually: decreased $N_p$ for some p. However, the following theorem shows this cannot happen.

Theorem FDD4. For all $0 \leq p \leq 1$, $m \geq 1$, $N_p(m+1) \geq N_p(m)$.

The proof of this theorem is shown in Appendix A.2 at the end of the Detailed Description.

Now, regarding the question of whether $N_p$ slows down, since I know of no closed form for P(m,n), I will take an indirect approach to estimating its growth rate. First, I will show that $N_p(m)$ grows at least as fast as a linear function of m:

Theorem FDD6. $\forall 0 \leq p \leq 1, \forall m > 0$, $N_p(m) > pm$.

The proof of this theorem is shown in Appendix A.3 at the end of the Detailed Description.

Theorem FDD6 allows us to conclude that $N_p(m)$ is at least linear in m. However, I will show that the limit as m goes to infinity of $P(m,N_p(m))$ is zero for all linear functions $N_p(m)$. Thus, $N_p(m)$ must grow faster than any linear function, because $P(m,N_p(m)) \geq p > 0$ for all m.

Theorem FDD10.

$$\frac{N_p(m)}{m} \text{ is unbounded as } m \to \infty.$$

The proof of this theorem is shown in Appendix A.3 at the end of the Detailed Description.

In conclusion, LS seems to render FDD largely ineffective. This is because for a given splitting number, m, the user must maintain impractically many addresses. For example, if m=8 (requiring only three two-version paragraphs to systematically generate the message versions), users must maintain at least 31 addresses to have a 50-50 chance of screening the message (as shown by the graph in FIG. 4). The analysis above shows that the minimum n required for any given nonzero screening probability increases faster than any linear function of m. This gives a decisive advantage to the spammers, since it is easier for them to increase the number of slots/versions than it is for typical users to add enough addresses to keep the screening probability acceptably high.

Collaborative Filtering

In collaborative filtering, users report spam messages to a central server, which records them and makes the list of such messages globally available to all users. When a user's mail software receives a new message, it checks it against the server's list; if found, it is discarded. Thus, in the best case, shortly after the first user reports a spam message, no other users are bothered by that message. Clearly, if every user reports every spam message seen, then only one user sees each message. (For this analysis, we ignore the geographic distribution of users which may lead to other users, seeing the message before the first user's report reaches the server.)

Advantages and Disadvantages. This approach has the advantage that the effort per user per message is very small in the best case. Moreover, it is pretty accurate and doesn't depend on managing keys, certificates, trust, multiple addresses or other side information. However, it has a few disadvantages as well. It requires the active participation of as many users as possible in not just deleting spam, but also forwarding it to the server. It has the annoying property that other, possibly unknown, users decide what is spam for a given user. This could lead to users missing messages that they wish to see, because another user deemed it spam. Finally, it is susceptible to abuse by politically motivated or otherwise malicious users in blacklisting messages they do not wish others to see.

CF vs LS(m)

Not every user will report every message in a timely manner. Users may be away from email, lack the time, forget, or just not feel like it. To model this let us define the active set of users (over a given period of interest) to be the set of those users who do report spam in a timely fashion. Let A denote the cardinality of the active set, while L denotes the total number of users. Let a=A/L.

Now, suppose the spammer splits the list m ways. If any one of the m versions fails to reach an active user, then L/m users will receive the message. Suppose we wish to maintain a probability at most p that no such partial failure occurs. Let $A_p(m)$ be the minimum value of A required to have probability at most p of such a failure.

Theorem CF1.

$$A_p(m) = L(1-(1-p^{1/m})^{m/L})$$

The proof of this theorem is provided in Appendix B at the end of the Detailed Description.

To get an idea of how this grows with m, we can show Theorem CF2.

$$A_p(m) \approx m \ln\left(\frac{1}{1-p^{1/m}}\right)$$

The proof of this theorem is provided in Appendix B at the end of the Detailed Description.

The coefficient of m in Theorem CF2 increases monotonically in m. Thus, the number of active list members has to increase with the number of message versions. To guarantee p at least 0.9, the table below shows the approximate required values of $A_p$ (using the approximation of Theorem CF2, which is independent of L, for simplicity).

| m | ≈$A_p$ |
|---|---|
| 128 | 909 |
| 256 | 1996 |
| 512 | 4346 |
| 1024 | 9402 |
| 2048 | 20224 |

Clearly, if m is not much smaller than L, then collaborative filtering is of little benefit, since at least m list members (now a significant fraction) must see a version of the message. On the other hand, as long as m<<L, the arms race also favors the spammer, since convincing users to become more active figures to be much harder than it is for the spammer to (e.g.) double m by creating one more paragraph variant-pair. In conclusion, it would appear that collaborative filtering loses the arms race against a list splitting spammer.

Manual Filtering

Manual Filtering (MF) denotes the fully manual process where the user reads some portion of each message, judges whether it is spam, and then deletes spam messages. This is by far the most widely used method of dealing with spam today.

Advantages and Disadvantages. About the only advantage of MF is its accuracy. It is presumably the most accurate approach, since the individual makes the judgement himself, with no intervening program introducing the possibility of error. It is not perfect, however, due to fatigue, carelessness, and fallibility of the human user. Its primary disadvantage includes its labor intensity and fundamental unfairness to the user: virtually all the costs (time, money, information overload) are borne by the user and/or his service provider, whereas the spammer receives any profits or other benefits generated by the bulk mailing.

MF vs LS(m)

If a spammer sends each message only once to the List, there is no advantage to him in using LS, since each user just sees one message. However, if the spammer wishes to send a message multiple times to the list, as seems to be fairly common practice currently, then LS does benefit the spammer by decreasing the effectiveness of MF. This is because humans appear to be good at recognizing when a message duplicates a previously seen message, so when using MF, duplicate spam messages are recognized sooner and hence deleted relatively quickly (without further cognitive consideration). Multiple versions of the same message, by contrast, will each be given cognitive consideration.

For the succeeding analysis, I will assume it is significantly better for the spammer if the user reads more versions of the message than fewer; this presumably increases the possibility of the user acting favorably on the message. (This appears to be the reasoning motivating current spammers to send the same message multiple times.) On the other hand, I will assume that immediate deletion of an identical copy does not confer this advantage. Thus, the game is for the spammer to trick each user into reading and considering the message contents as many times as possible.

Theorem MF1. For all m≧1, k≧1, if an LS(m)-spammer sends k times to the list (i.e., sends the same set of message versions k times, but randomly reassigns the addresses to the m slots each time), then each user receives an average of $$E(m, k) = m\left(1 - \left(\frac{m-1}{m}\right)^k\right)$$

distinct message versions. The proof of this theorem is shown in Appendix C at the end of the detailed description.

By differentiating E(m,k)/k with respect to k, one can show that it decreases for 1≦k≦m. Therefore, E(m,k)/k is greater than or equal to E(m,m)/m, which by Lemma FDD8 is approximately 1−1/e≈0.632 . . . for large enough m. Thus, the spammer can be assured of getting at least about 0.632 k message considerations per MF user in k≦m rounds where, by hypothesis, the non-LS spammer gets only 1. Note also that for k<<m, as would be typical, E(m, k)/k is very close to 1, hence E(m, k) is close to k even for moderate m. Clearly, manual filtering suffers when the spammer uses list splitting and resends messages to the list.

Note that if the spammer wished to defeat only MF, he would have no need to re-randomize the list each time. Simply cyclically permuting the message versions among the sublists each time would achieve slightly more message considerations (exactly k instead of almost k per user). However, this approach would be worse against FDD, because exactly the same set of users would get the message each time, whereas by re-randomizing each time, the spammer will evade the FDD filters of a different subset of FDD users each time. Similar reasoning applies to make randomizing slightly more effective against CF as well. This choice is obviously a trade off that must be made based on the expected mix of techniques used by the target user population.

Impact on Other Anti-Spam Technologies

A technique related to collaborative filtering that is reported to be in use by some ISPs is to detect when some fraction f of users all receive the same message; the message is then examined by a human to see if it is spam. This checking is most likely done by examining only the recipient lists in the SMTP envelope of the message, since it is obviously impractical to compare all pairs of the millions of messages received daily. If a list-splitting spammer sets m greater than 1/f, then no message version is likely to go to enough users to be Bagged as potential spam. And yet, ISPs cannot set f too low, as there are legitimate reasons to send messages to moderate-sized sets of users.

Another anti-spam technique is to require a valid return address on any incoming message by verifying a valid DNS entry before delivering the message to the users. See B. Costales, E. Allman, & N. Rickert; Sendmail; Sebastopol, Calif.: O'Reilly and Assoc; 1993. See http://~.sendmail.org/ for the latest enhancements. List-splitting potentially multiplies the number of verifications that need to be performed by a factor of m, if during version generation the return address is varied. This is true even if the verifying server caches verified addresses. Whether this is a significant impact depends on the size of m and on the cost of the verification process.

Rule-based filtering depends on users (or administrators) maintaining a set of recognition rules to detect spam. While such rule sets can be arbitrarily powerful, some classes of rule set are vulnerable to LS. For example, one approach applies information retrieval tools (see G. Salton, Ed.; *The SMART Retrieval System: Experiments in Automatic Document Processing*; Englewood Cliffs, N.J.: Prentice-Hall; 1971) to discover information-carrying words that are highly indicative of spam content. However, nothing prohibits spammers from sampling email streams and running such tools themselves. By incorporating synonym techniques into message version generation, they can use LS to alter the statistical properties of the messages to avoid such rule sets. In another approach, humans construct rules, that are abstractions of previously reported spam messages. This is equivalent to CF (hence vulnerable to LS) unless the abstractions capture other, unseen message versions as well. This depends on the skill and speed of the human rule set maintainers.

Various approaches are based on verifying the message sender via public key cryptography. See RSA Data Security; "S/MIME Central"; http://raw.rsa.com/smime/; S. Garfinkel; *PGP: Pretty Good Privacy*; Sebastopol, Calif.: O'Reilly and Assoc; 1995. One approach is for users to accept only messages signed with a pre-approved key. This approach is impervious to list-splitting, since presumably one won't approve the key of a spammer. However, this approach is restrictive, since it doesn't allow one to receive email from mailing lists or any sources not pre-approved by the user. A less restrictive approach is to maintain a list of known spammers's keys and accept all signed messages except those signed by spammer keys. This approach is impervious to list-splitting as described thus far; however, by maintaining a large set of valid public keys, a spammer can create alternative message versions signed by different keys. By increasing m, the spammer can succeed even when users collaboratively post lists of spammer keys. Of course, if the cost to register a key is significant; it may be too costly for spammers to generate m new keys for each message. It is not clear what the cost of registering a key will be in the future, however.

By contrast, the email channels approach (see R. J. Hall; How to avoid unwanted email; *Comm. ACM* 41(S'), 88-95, March 1998) exploits the simple idea that spammers must know a valid address in order to successfully send email to a user. The user is provided with a transparent way of allocating and deallocating different addresses for use by distinct correspondents. Thus, if a spammer obtains one address for a user and sends a message to it, the user can simply close the channel and all subsequent messages are bounced by the server at the protocol level before the message data are even transferred. Because this approach is not dependent on message content, it is completely impervious to list-splitting.

Thus, Anti-spam techniques based on the various forms of duplicate detection are useful only as long as spammers don't use the list-splitting countercountermeasure, because the LS-spammer has a powerful advantage in the arms race. I believe the anti-spam research and development communities should focus attention instead on the techniques that are impervious to list Splitting, such as cryptographic techniques and the email channels approach.

Appendix A: FDD-Related Proofs

A.1 Computing P(m, n)

Theorem FDD1. The number of assignments of n things to m slots leaving a singleton in at least one of the first k slots, is $$s_k(m, n) = \sum_{j=1}^{\min\{k,n\}} (-1)^{j-1} \binom{k}{j} n^{\underline{j}} (m-j)^{n-j}$$

where, following notation of Graham et al in R. Graham, D. Knuth, O. Patashnik; *Concrete Mathematics: A Foundation for Computer Science*; Reading, Mass.: Addison-Wesley; 1989, 1994, $$a^{\underline{j}} = \begin{cases} 1 & \text{if } (j=0) \\ a(a-1)(a-2)\ldots(a-j+1) & \text{if (integer } j > 0) \end{cases}$$

Proof. When k=1, we must first assign any one of the n things to slot 1 and then assign the other n−1 to the other m−1 slots in all $(m-1)^{n-1}$ ways. Thus, $S_1(m,n)=n(m-1)^{n-1}$. Proceed by induction, assuming the theorem true for all $1 \leq i \leq k-1$. Any assignment having a singleton in at least one of the first k slots either (a) has a singleton in at least one of the first k−1 slots (possibly one in slot k as well), or else (b) has slot k a singleton and has no singleton in any slot less than k. In case (a) there are $S_{k-1}(m,n)$ such assignments, and in case (b) we pick one of the n to be the singleton in slot k and then assign the rest to the other slots, but subtract all cases in which a singleton appears in a slot less than k: $n[(m-1)^{n-1}-S_{k-1}(m-1, n-1)]$. To get $S_k(m,n)$, we sum cases (a) and (b) and use the induction hypothesis:

$$\left(\sum_{j=1}^{\min\{k-1,n\}} (-1)^{j-1} \binom{k-1}{j} n^{\underline{j}}(m-j)^{n-j}\right) + n(m-1)^{n-1} -$$

$$n \sum_{l=1}^{\min\{k-1,n-1\}} (-1)^{l-1} \binom{k-1}{l} (n-1)^{\underline{l}}(m-1-l)^{n-1-l}$$

Now, changing the righthand index of summation from l to j=l+1 and absorbing the middle summand into the righthand sum:

$$\left(\sum_{j=1}^{\min\{k-1,n\}} (-1)^{j-1} \binom{k-1}{j} n^{\underline{j}}(m-j)^{n-j}\right) +$$

$$\sum_{j=1}^{\min\{k,n\}} (-1)^{j-1} \binom{k-1}{j-1} n^{\underline{j}}(m-j)^{n-j}$$

Observe that k−1 choose k is zero, so we can let the left hand sum range up to min {k, n} as well and then combine like terms, getting.

$$\sum_{j=1}^{\min\{k,n\}} (-1)^{j-1} \left[\binom{k-1}{j} + \binom{k-1}{j-1}\right] n^{\underline{j}}(m-j)^{n-j}$$

Applying the Pascal Triangle identity (see R. Graham, D. Knuth, O. Patashnik; *Concrete Mathematics: A Foundation for Computer Science*; Reading, Mass.: Addison-Wesley; 1989, 1994):

$$\binom{k-1}{j} + \binom{k-1}{j-1} = \binom{k}{j}$$

we get exactly the righthand side as stated in the Theorem.

A.2 Monotonicity of $N_p$

Lemma FDD3. $\forall m \geq 1$, $\forall n \geq 2$, $P(m+1,n) < \max_{0 \leq k < n, k \neq 1} P(m, n-k)$.

Proof. Observe that in assigning n addresses to m+1 slots, we can first choose a subset of the addresses to put into slot 1 and then assign the rest to the other m slots. Thus, we can break up the cases by the number of addresses assigned to slot 1. The probability of getting no singletons (in any slot) when the resulting assignment has k addresses in slot 1 is $$\binom{n}{k} \frac{1}{(m+1)^k} \left(\frac{m}{m+1}\right)^{(n-k)} P(m, n-k),$$

except when k=1, in which case there are no no-singleton cases (because of the singleton in slot 1). The formula above is justified by observing that any such assignment has to first choose the k elements, then the random assignments of those addresses must be to slot 1, then the other n−k addresses must each be assigned to one of the other m out of m+1 slots in such a way that there are no singletons among them. By summing these independent cases, we get $$P(m+1, n) = \sum_{k=0, k \neq 1}^{n} \binom{n}{k} \frac{1}{(m+1)^k} \left(\frac{m}{m+1}\right)^{(n-k)} P(m, n-k)$$

Let $X = \max_{0 \leq k < n, k \neq 1} P(m, n-k)$ and substitute it for $P(m,n-k)$ above:

$$P(m+1, n) \leq X\left(\frac{1}{X(m+1)^n} + \sum_{k=0, k \neq 1}^{n-1} \binom{n}{k} \frac{1}{(m+1)^k} \left(\frac{m}{m+1}\right)^{(n-k)}\right)$$

$$= \frac{X}{(m+1)^n}\left(\frac{1}{X} + \sum_{k=0, k \neq 1}^{n-1} \binom{n}{k} m^{(n-k)}\right)$$

$$= \frac{X}{(m+1)^n}\left(\frac{1}{X} + (m+1)^n - nm^{n-1} - 1\right)$$

$$= X\left(1 - \frac{nm^{n-1} + 1 - \frac{1}{X}}{(m+1)^n}\right)$$

(The second equality follows from the Binomial Theorem.) $X \geq 1/m$, because $\forall m \geq 1$, $P(m,2) = 1/m$. It follows that $nm^{n-1} + 1 - 1/X \geq m(nm^{n-2} - 1) + 1$, which is positive if $n \geq 2$, $m \geq 1$. Thus, $P(m+1, n) < X$.

Theorem FDD4. For all $0 \leq p \leq 1, m \geq 1$, $N_p(m+1) \geq N_p(m)$.

Proof. Note that $N_0(m) = 1$ for all m, so the p=0 case satisfies the theorem. For p>0, $\forall j$, if $1 \leq j < N_p(m)$ then $P(m, j) < p$; hence, by Lemma FDD3, for all such j, $P(m+1, j) < p$ as well. Since $P(m+1, N_p(m+1)) \geq p$ by definition- of N, we conclude $N_p(m+1) \geq N_p(m)$.

A.3 Superlinearity of $N_p$

Lemma FDD5. Let $0 < q \leq 1$. $\forall m, n, 1 \leq n \leq \lfloor qm \rfloor, P(m,n) < q$.

Proof. Order the n addresses. Then, in creating an assignment of the addresses to the m slots, we first assign the first n−1 addresses arbitrarily to the m slots. Then, if $n \leq \lfloor qm \rfloor$, this leaves at least $(m - \lfloor qm \rfloor + 1)$ empty slots. Thus, the probability of putting the nth and final address into a previously empty slot is strictly greater than $(1 - \lfloor qm \rfloor/m)$, which is greater than or equal to $(1-q)$. Thus, among all assignments, strictly more than $(1-q)$ of them have a singleton containing only the nth address, hence the message will not be screened for those.

Theorem FDD6. $\forall 0 \leq p \leq 1$, $\forall m > 0, N_p(m) > pm$.

Proof. Since by definition $P(m, N_p(m)) \geq p$, and since $N_0(m) = 1$, we apply Lemma FDD5 for the case q=p to conclude the theorem.

Lemma FDD7. For integer j>0, $$\lim_{m \to \infty} \left(\frac{m^j}{m^{\underline{j}}}\right) = 1$$

Proof. This follows straight-forwardly from the observation that $m^{\underline{j}}$ is a polynomial of degree j in m whose leading coefficient is 1.

Lemma FDD8. For fixed integer j>0, $$\lim_{m \to \infty} \left(\frac{m-j}{m}\right)^m = e^{-j}$$

Proof. This follows from the Binomial Theorem and Lemma FDD7.

$$(1 - j/m)^m = \sum_{l=m}^{m} \binom{m}{l}(-j/m)^l$$

$$= \sum_{l=0}^{m} \frac{m^{\underline{l}}}{l!}(-j/m)^l$$

$$= \sum_{l=0}^{m} (-j)^l \frac{1}{l!}\left(\frac{m^{\underline{l}}}{m^l}\right)$$

By Lemma FDD7, we conclude $$\lim_{m \to \infty} (1 - j/m)^m = \sum_{l=0}^{\infty} \frac{(-j)^l}{l!}$$

The righthand side is just the Taylor Series for $e^x$ evaluated at x=−j.

Let us define $\alpha(m)$ by the equation $N_p(m) = m\alpha(m)$.

Lemma FDD9. For $\alpha(m)$ as above, integer $k \geq 1$, and for sufficiently large m, $$P_k(m, \alpha(m)m) \approx \left(1 - \frac{\alpha(m)}{e^{\alpha(m)}}\right)^k$$

Proof. Under the assumptions, $$P_k(m, \alpha(m)m) = \sum_{j=0}^{k} (-1)^j \binom{k}{j} \frac{(\alpha(m)m)^{\underline{j}}}{m^j}\left(\frac{m-j}{m}\right)^{(\alpha(m)m-j)}$$

Note that the present discussion surrounds behavior for large m, so we may assume the upper limit of summation in the formula for $P_k$ is just k, since $n=\alpha(m)m$ grows without bound.

Now, for large enough m, we can simplify our Pk expression above:

$$P_k(m, \alpha(m)m) \approx \sum_{j=0}^{k} (-1)^j \binom{k}{j} \alpha(m)^j \left(\frac{m-j}{m}\right)^{(\alpha(m)m-j)} \quad \text{(by Lemma FDD7)}$$

$$\approx \sum_{j=0}^{k} (-1)^j \binom{k}{j} \alpha(m)^j (e^{-j\alpha(m)}) \quad \text{(by Lemma FDD8)}$$

$$\approx \sum_{j=0}^{k} \binom{k}{j} \left(\frac{-\alpha(m)}{e^{\alpha(m)}}\right)^j$$

Applying the Binomial Theorem to this last expression, we get the desired conclusion.

Theorem FDD10.

$\frac{N_p(m)}{m}$ is unbounded as $m \to \infty$.

Proof. Recall that by Theorem FDD6, $N_p(m)=\alpha(m)m>pm>0$ for all m. We argue by contradiction as follows. Suppose $\alpha \sim O(1)$. Then $\exists L, 0<L<\infty$, such that $p<\alpha(m)<L$ for all $m>m_\alpha$ for some $m_\alpha>0$. Note that for all $x \in [p,L]$, $$0 < q \leq \frac{x}{e^x} \leq \frac{1}{e} < 1,$$

where $$q = \min\left\{\frac{p}{e^p}, \frac{L}{e^L}\right\}.$$

Thus, the righthand side expression in Lemma FDD9 goes to zero with increasing k. Since as m increases, making the approximation better, we can take larger and larger k as well, we conclude that for all real numbers $\beta>0$, for large enough m, $$P(m,\alpha(m)m)<\beta$$

which implies that $P(m,\alpha(m)m)<\beta$ goes to zero as m goes to infinity. But by assumption, $\alpha(m)m=N_p(m)$, so $P(m,\alpha(m)m) \geq p>0$ for all m. This contradiction proves that $$\frac{N_p(m)}{m} = \alpha(m) \notin O(1).$$

This proves the theorem.

Appendix B: CF-Related Proofs

Theorem CF1.

$$A_p(m)=L(1-(1-p^{1/m})^{m/L})$$

Proof. The probability that at least one of the L/m copies of a single message version hits the active set is $(1-(1-a)L/m)$. Thus, the probability that some copy of each of m messages hits the active set is $$p=(1-(1-a)^{L/m})^m$$

Solving for a, we get $$a=1-(1-p^{1/m})^{m/L}$$

Since A=La by definition, we've proved CF1.

Theorem CF2.

$$Ap(m) \approx m \ln\left(\frac{1}{1-p^{1/m}}\right)$$

as long as m<<L.

Proof. By Theorem CF1, $$A_p(m)=L(1-(1-p^{1/m})^{m/L})$$

By the Binomial Theorem, $$(1-p^{1/m})^{m/L} = \sum_{k=0}^{\infty} \binom{m/L}{k}(-p^{1/m})^k$$

Substituting into the above equation and simplifying, $$A_p(m) = mp^{1/m} - \frac{m(m-L)}{2L}p^{2/m} + \frac{m(m-L)(m-2L)}{6L^2}p^{3/m} \ldots$$

For m<<L, we can approximate (m−iL) by −iL for all $i \geq 1$:

$$A_p(m) \approx m\left(p^{1/m} + \frac{1}{2}p^{2/m} + \frac{1}{3}p^{3/m}\right)$$

The parenthesized expression is, however, just the negative of the Taylor expansion of ln $(1-p^{1/m})$. Moving the negation inside the logarithm, we get exactly the statement of the Theorem.

Appendix C: MF-Related Proof

Theorem MF1. For all $m \geq 1$, $k \geq 1$, if an LS(m)-spammer sends k times to the list (i.e., sends the same set of message versions k times, but randomly reassigns the addresses to the m slots each time), then each user receives an average of $$E(m, k) = \left(1 - \left(\frac{m-1}{m}\right)^k\right)$$

distinct message versions.

Proof. For a given recipient, the total number of possible assignments of message versions to the k "slots" (message rounds) is simply $m^k$. The total number of such assignments involving exactly d distinct message versions, for $1 \leq d \leq k$, is $$D(m, k, d) = \left\{ {k \atop d} \right\} m^d$$

where $$\left\{ {k \atop d} \right\}$$

represents the number of distinct ways of partitioning a set of size k into d nonempty subsets (Stirling Numbers of the Second Kind, as described in R. Graham, D. Knuth, O. Patashnik; *Concrete Mathematics: A Foundation for Computer Science*; Reading, Mass.: Addison-Wesley; 1989, 1994) This is true, because for each distinct partitioning of the k slots, we then assign any of m message versions to all slots of the first partition, then for each such assignment any of m−1 message versions to all slots of the second partition, etc, down to for each such assignment to the first d−1 slots assigning any of the remaining m−d+1 message versions to all slots of the dth partition. The foregoing analysis implies identity SN1:

$$\sum_{d=1}^{k} \left\{ {k \atop d} \right\} m^d = m^k$$

Also, a simple case analysis yields (see R. Graham, D. Knuth, O. Patashnik; *Concrete Mathematics: A Foundation for Computer Science*; Reading, Mass.: Addison-Wesley; 1989, 1994) identity SN2:

$$\left\{ {k+1 \atop d} \right\} = \left\{ {k \atop d-1} \right\} + d \left\{ {k \atop d} \right\}$$

Now, each assignment to the k slots is equally likely, because LS assigns the message versions uniformly randomly, so the average number of distinct message versions per user can be obtained by multiplying the number of distinct versions received in each case (d) by the probability of the case (D(m, k,d)/$m^k$) and summing all cases:

$$E(m, k) = \frac{1}{m^k} \sum_{d=1}^{k} d \left\{ {k \atop d} \right\} m^d$$

Applying SN2 to the expression for E(m,k), we get $$m^k E(m, k) = \sum_{d=1}^{k} \left( \left\{ {k+1 \atop d} \right\} - \left\{ {k \atop d-1} \right\} \right) m^d$$

$$= \left( \sum_{d=1}^{k} \left\{ {k+1 \atop d} \right\} m^d \right) - \sum_{d=1}^{k} \left\{ {k \atop d-1} \right\} m^d$$

-continued $$= \left( \sum_{d=1}^{k+1} \left\{ {k+1 \atop d} \right\} m^d \right) - \left\{ {k+1 \atop k+1} \right\} m^{k+1} - m \sum_{d=1}^{k} \left\{ {k \atop d-1} \right\} (m-1)^{d-1}$$

$$= m^{k+1} - m^{k+1} - m \sum_{i=1}^{k-1} \left\{ {k \atop i} \right\} (m-1)^i$$

$$= m^{k+1} - m^{k+1} - m \left( (m-1)^k - \left\{ {k \atop k} \right\} (m-1)^k \right)$$

$$= m^{k+1} - m^{k+1} - m(m-1)^k + m^{k+1}$$

$$= m(m^k - (m-1)^k)$$

The fourth, fifth, and sixth equalities above follow from Identity SN1 and the fact that for $$n \geq 1, \left\{ {n \atop n} \right\} = 1$$

by the Pigeonhole Principle. Dividing the last equality through by $m^k$, we get exactly the statement of the Theorem.

The present invention provides a system and method for defeating spam countermeasures that employ techniques of duplicate detection.

The invention claimed is:

1. Apparatus comprising a processor and a memory, said memory storing filter countermeasure instructions executable by said processor, said memory further storing an address list that includes a set of electronic mail addresses of prospective recipients of messages, said instructions causing said processor to
divide said address list into a plurality of sublists in such a way that individual ones of said addresses deemed to be similar are assigned to different ones of said sublists, said memory further storing said plurality of sublists,
assign individual ones of said sublists to respective different versions of the messages, and
send to addresses in each sublist a one of said respective different versions of the messages assigned to that sublist.

2. The apparatus of claim 1 wherein first and second of said addresses are deemed to be similar if said first and second of said addresses meet at least one predetermined similarity criterion.

3. The apparatus of claim 2 wherein said similarity criterion is that said first and second addresses have a string of characters in common that meets a predetermined metric.

4. The apparatus of claim 3 wherein said metric is that said string of characters comprises at least a predetermined percentage of the characters of at least said first address.

5. The apparatus of claim 2 wherein each of said addresses is of the form X@Y, wherein X and Y comprise respective character strings, and wherein said similarity criterion is that X is the same in said first and second addresses.

6. The apparatus of claim 2 wherein each of said addresses is of the form X@Y, wherein X and Y comprise respective character strings, and wherein said similarity criterion is that Y is the same in said first and second addresses.

7. The apparatus of claim 1 wherein each of said addresses is of the form X@Y, wherein X and Y comprise respective character strings.

8. The apparatus of claim 1 wherein first and second of said addresses are deemed to be similar if said first and second of said addresses meet a criterion indicating that they are likely to point to a same electronic mailbox.

9. Apparatus comprising a processor and a memory, said memory storing filter countermeasure instructions executable by said processor, said memory further storing an address list that includes a set of electronic mail addresses of prospective recipients of messages, said instructions causing said processor to divide said address list into a plurality of sublists, each of said sublists comprising addresses from said set of electronic mail addresses, and individual addresses of said set of electronic mail addresses being put in different sublists if said individual addresses of said set of electronic mail addresses are determined to be similar to one another based on at least one predetermined similarity criterion, said memory further storing said plurality of sublists, and send different versions of a message to the addresses in respective ones of said sublists.

10. The apparatus of claim 9 wherein each of said addresses is of the form X@Y, wherein X and Y comprise respective character strings.

11. The apparatus of claim 10 wherein said similarity criterion is that X is the same in first and second of said addresses.

12. The apparatus of claim 10 wherein said similarity criterion is that Y is the same in first and second of said addresses.

13. The apparatus of claim 9 wherein said similarity criterion is that first and second addresses have a string of characters in common that meets a predetermined metric.

14. The apparatus of claim 13 wherein said metric is that said string of characters comprises at least a predetermined percentage of the characters of at least said first address.

15. The apparatus of claim 9 wherein said similarity criterion is that first and second of said addresses are likely to point to a same electronic mailbox.

16. Apparatus comprising a processor and a memory, said memory storing filter countermeasure instructions executable by said processor, said memory further storing an address list that includes a set of electronic mail addresses of prospective recipients of messages, said instructions causing said processor to divide said address list into a plurality of sublists, each of said sublists comprising addresses from said set of electronic mail addresses, and individual addresses of said set of electronic mail addresses being put in different sublists randomly, said memory further storing said plurality of sublists, and send different versions of a message to the addresses in respective ones of said sublists.

17. The apparatus of claim 16 wherein each of said addresses is of the form X@Y, wherein X and Y comprise respective character strings.

\* \* \* \* \*